United States Patent
Talsma

(10) Patent No.: US 11,708,221 B2
(45) Date of Patent: Jul. 25, 2023

(54) SELF-STACKING SPIRAL BELT CONVEYOR WITH SMOOTH DIAMETER REDUCTION

(71) Applicant: Laitram, L.L.C., Harahan, LA (US)

(72) Inventor: Casper Fedde Talsma, Valencia (ES)

(73) Assignee: Laitram, L.L.C., Harahan, LA (US)

( * ) Notice: Subject to any disclaimer, the term of this patent is extended or adjusted under 35 U.S.C. 154(b) by 13 days.

(21) Appl. No.: 17/610,362

(22) PCT Filed: May 12, 2020

(86) PCT No.: PCT/US2020/032472
§ 371 (c)(1),
(2) Date: Nov. 10, 2021

(87) PCT Pub. No.: WO2020/247155
PCT Pub. Date: Dec. 10, 2020

(65) Prior Publication Data
US 2022/0219906 A1 Jul. 14, 2022

Related U.S. Application Data

(60) Provisional application No. 62/857,350, filed on Jun. 5, 2019.

(51) Int. Cl.
| B65G 17/08 | (2006.01) |
| B65G 15/32 | (2006.01) |
| B65G 15/60 | (2006.01) |
| B65G 17/40 | (2006.01) |
| B65G 21/18 | (2006.01) |

(52) U.S. Cl.
CPC .......... *B65G 17/086* (2013.01); *B65G 15/32* (2013.01); *B65G 15/60* (2013.01); *B65G 17/40* (2013.01); *B65G 21/18* (2013.01); *B65G 2207/24* (2013.01)

(58) Field of Classification Search
CPC .. B65G 17/086; B65G 15/32; B65G 2207/24; B65G 17/40; B65G 21/18; B65G 15/60
USPC ......................................................... 198/778
See application file for complete search history.

(56) References Cited

U.S. PATENT DOCUMENTS

| 3,348,659 A | 10/1967 | Roinestad | |
| 5,460,260 A * | 10/1995 | Ochs | B65G 21/18 198/778 |
| 6,695,128 B2 | 2/2004 | Palmaer et al. | |
| 7,258,226 B2 | 8/2007 | Nelson et al. | |
| 7,270,231 B2 * | 9/2007 | Heber | B65G 21/18 198/848 |

(Continued)

FOREIGN PATENT DOCUMENTS

WO 2019/038727 * 2/2019 ............ B65G 17/06

*Primary Examiner* — James R Bidwell
(74) *Attorney, Agent, or Firm* — James T. Cronvich

(57) ABSTRACT

A spiral conveyor having a self-stacking conveyor belt positively driven on a helical path up or down a drive drum. Stacker supports at opposite sides of the belt support the tiers above. Locking structure on the outer stacker supports interlock consecutive tiers. Drive members on the drive drum have a belt entrance segment and a positive-drive segment. The positive-drive segment has ridges that engage the inner side of the belt without slip. The entrance segment provides a smooth reduction in drum diameter without drive ridges to multiple belt tiers entering the helical path.

19 Claims, 4 Drawing Sheets

(56) References Cited

U.S. PATENT DOCUMENTS

| | | | |
|---|---|---|---|
| 7,347,316 B2 | 3/2008 | Heber | |
| 8,302,764 B2 | 11/2012 | Johnson | |
| 8,820,517 B2 * | 9/2014 | Gramby | B65G 15/30 |
| | | | 198/848 |
| 9,079,719 B2 * | 7/2015 | Talsma | B65G 33/24 |
| 9,334,121 B2 | 5/2016 | Bogle et al. | |
| 9,394,109 B2 * | 7/2016 | Talsma | B65G 15/02 |
| 9,481,523 B2 | 11/2016 | Talsma et al. | |
| 10,155,627 B2 * | 12/2018 | Chang | B65G 21/18 |
| 2004/0011627 A1 * | 1/2004 | Palmaer | B65G 17/086 |
| | | | 198/778 |
| 2014/0021020 A1 * | 1/2014 | Bogle | B65G 15/30 |
| | | | 198/850 |
| 2018/0290833 A1 | 10/2018 | Neely et al. | |
| 2019/0382207 A1 | 12/2019 | Wu | |

\* cited by examiner

US 11,708,221 B2

SELF-STACKING SPIRAL BELT CONVEYOR WITH SMOOTH DIAMETER REDUCTION

BACKGROUND

The invention relates generally to power-driven conveyors and, more particularly, to spiral belt conveyors.

Conveyor belts are typically used for conveying bulk material, such as foodstuffs or other materials, that must be transported through a cooled or refrigerated environment. Typical conveyor belts have the advantage that relatively little energy is required for transporting the bulk material across horizontal surfaces. The conveyance of bulk material, however, is limited by such systems to horizontal routes or to routes with only relatively small inclines. To overcome greater heights or inclines, it is necessary to transfer the bulk material to another conveyor system, for example, a bucket chain conveyor. In the transport of material to be refrigerated, it is often desirable to maximize the time of transport within the cooled environment. It is desirable to provide a conveyor belt system that transports goods along an extended path.

Spiral belt conveyors, in which a conveyor belt follows a helical path, are used in certain applications because they allow for an extended path with minimal floor space. For example, spiral belt conveyors are often used in freezers and ovens to provide a long conveying path with a small footprint.

Self-stacking spiral belts are used to form a helical path with minimal framing. A self-stacking conveyor belt uses side plates or side guards coupled to the side edges of the conveyor belt to form a self-supporting stack. The belt travels in a straight path until it enters a spiral or helical configuration at a tangent infeed point. When aligned in the helical configuration, the lowest tier of the belt is supported by a frame or drive system, while the upper tiers are supported by the lower tiers. The interface between adjacent tiers is designed to keep the belt supported and laterally aligned. The tiers are laterally aligned by resting the upper edge of a lower side guard against the bottom side edge of the belt in a tier above.

Some self-stacking spiral belts are positively driven without slip by vertical drive bars on the periphery of a drive drum whose diameter is greatest at the tangent infeed point to reduce tension in the belt. The bottom ends of the drive bars are recessed slightly above the level of the tangent infeed point. But until the belt reaches the level of the drive bars, it is pulled along only by belt pull and frictional contact between its inside edge and the drive drum. To keep the tension in the belt as low as possible, the distance between the tangent infeed point and the level of the bottom ends of the drive bars has to be small.

SUMMARY

One version of a spiral conveyor embodying features of the invention comprises an arrangement of drive members that extend in length from tops to bottoms and define a cylinder having a vertical axis about which the arrangement of drive members is rotatable and a conveyor belt arranged to follow a helical path in multiple tiers up or down the drive members. The conveyor belt extends in thickness from a top side to a bottom side and in width from an inner side at the drive members to an outer side and includes inner side supports standing up from the top side at the inner side and outer side supports standing up from the top side at the outer side to support the bottom side of the conveyor belt at the inner and outer sides on the tier above on the helical path. The outer side supports have first locking structure, and the conveyor belt has second locking structure at the outer side at the bottom side that engages the first locking structure on the tier below to lock the tiers together. The drive members have an outer face along which the conveyor belt rides on the helical path and whose distance from the vertical axis is greater at the bottom of the drive member than at the top for an upgoing conveyor belt on the helical path or is greater at the top of the drive member than at the bottom for a downgoing conveyor belt on the helical path. The drive members include ridges that extend radially outward of the outer faces along a portion of the length of the drive members to positively drive the conveyor belt without slip along the helical path.

Another version of a spiral conveyor comprises a conveyor belt that extends in width from a first side to a second side and includes first side supports standing up from the first side and second side supports standing up from the second side and including locking structure. Drive members each include a first segment and a second segment and extend in length in a generally vertical direction and rotatable about a vertical axis. At least some of the plurality of drive members are arranged to positively engage the conveyor belt only in the first segment and drive the conveyor belt without slip on a helical path in tiers locked together by the locking structure. The drive members are arranged to space the conveyor belt from the vertical axis so that the distance of the conveyor belt from the vertical axis varies along the length of the drive members.

Yet another version of a spiral conveyor comprises a spiral stacker belt having a plurality of first and second supports at first and second sides of the stacker belt capable of traveling up or down a helical path of multiple tiers spaced apart and supported by the first and second supports on the tier below. Drive members extending in length in a generally vertical direction are rotatable about a vertical axis. At least some of the drive members each include a positive-drive segment having drive ridges and an entrance segment devoid of drive ridges. The entrance segment is below the positive-drive segment for an upgoing spiral stacker belt and is above the positive-drive segment for a downgoing spiral stacker belt. The spiral stacker belt enters a helical path about the plurality of drive members along the entrance segment and is positively driven without slip up or down the helical path by the drive ridges in the positive-drive segment. Multiple tiers of the spiral stacker belt wrap around the entrance segment before engaging the positive-drive segment.

In another aspect, a conveyor belt module embodying features of the invention comprises a central portion that extends longitudinally from a first end to a second end, laterally from a first side to a second side, and in thickness from a top side to a bottom side. A side support stands up from the top side at the second side. A distal end of the side support has locking structure laterally facing either inward or outward. Laterally facing locking structure at the bottom side of the second side engages the locking structure of the side support of another such conveyor module below.

DETAILED DESCRIPTION

Figure 1:
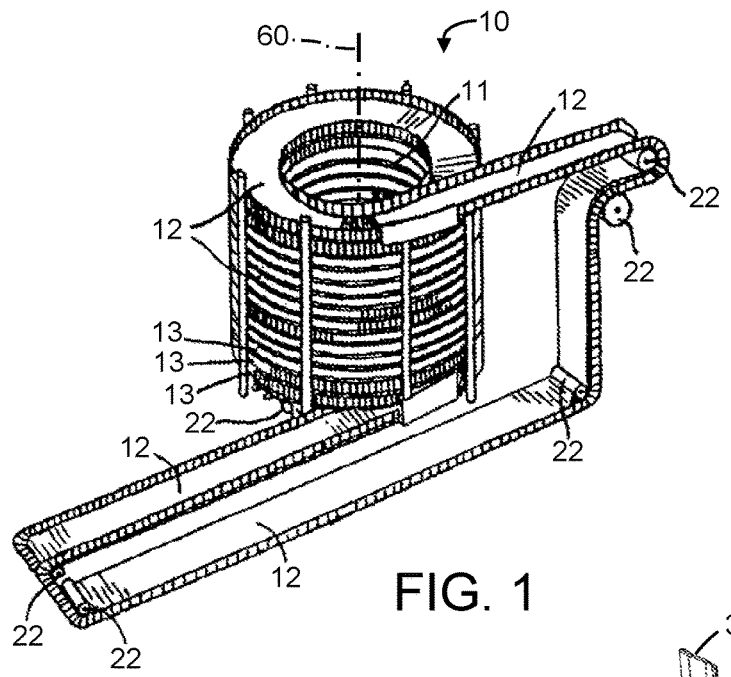
FIG. 1 is an isometric view of a self-stacking spiral conveyor embodying features of the invention.

A self-stacking spiral conveyor system is shown schematically in FIG. 1. The spiral belt conveyor 10 conveys articles vertically along a substantially helical path. The spiral belt conveyor includes a conveyor belt 12—a spiral self-stacking, or stacker, belt—arranged in a helical stack 11, comprising tiers 13 of the belt stacked serially and directly on one another. The belt travels around various take-up, idle, and feed sprockets 22 as it makes it way from the exit at the top of the stack back to the entrance at the bottom. Alternatively, the belt may enter at the top and exit at the bottom of the stack. The spiral belt conveyor 10 may be used within a refrigerator or a cooler, for example, providing the articles being conveyed with an extended route for cooling, or within a heating system for baking, proofing, or heating products.

Figure 2:
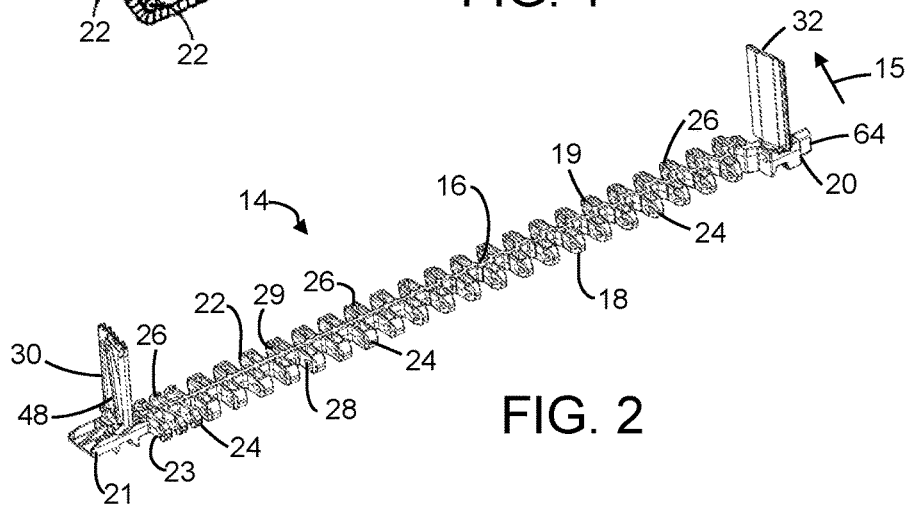
FIG. 2 is an isometric view of a belt module used to construct a self-stacking belt for a spiral conveyor as in FIG. 1.

The conveyor belt 12 is constructed of a series of rows, each comprising one or more belt modules 14, like the belt module of FIG. 2. A row may comprise a single module spanning the width of the belt or a number of side-by-side modules. The exemplary belt module 14 includes a central portion 16 that extends longitudinally in a direction of belt travel 15 from a first end 18 to a second end 19, laterally from an inner side 20 to an outer side 21 and in thickness from a top side 22 to a bottom side 23. A first set 24 of hinge elements is formed along the first end 18 of the module; a second set 26, along the second end 19. Rod openings 28, 29 in the hinge elements align to form lateral passageways through the first and second sets 24, 26 of hinge elements. The passageways admit a hinge rod (not shown) that connects a row of similar side-by-side modules to an adjacent row of modules into a conveyor belt. The first set of hinge elements 24 along a row of modules interleaves with the second set of hinge elements 26 of a longitudinally adjacent row to form a hinge with the hinge rod. The rod openings 28, 29 through one or both of the leading and trailing hinge elements may be elongated in the direction of belt travel to allow the belt to collapse at the inside of a turn, while the outside edge expands.

The belt modules 14 are preferably injection molded out of a thermoplastic material, such as polyethylene, polypropylene, acetal, nylon, or a composite resin. The belt modules may have any suitable configuration and are not limited to the exemplary embodiment.

Side supports 30, 32 are coupled to each side edge of the conveyor belt row. In the embodiment of FIG. 2, a single module 14 spans an entire row, with side supports 30, 32 standing up from each side of the module. Alternatively, a row of the conveyor belt may comprise a plurality of modules arranged side-by-side, with an inner side support 32 coupled to the inner side 20 of an inner module and an outer side support 30 coupled to the outer side 21 of an outer module. The side supports may be integrally formed with the module, or may be coupled to the module using screws, bolts, ultrasonic welding, a snap-fit connection, or other suitable fastening means. The side supports facilitate stacking of the belt in the helical configuration, as each module rests on a side support on a lower tier.

Figure 3:
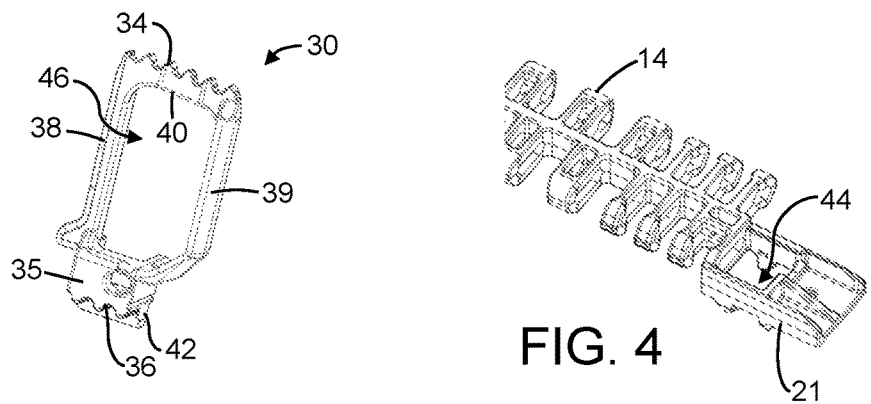
FIG. 3 is an enlarged axonometric view of an outer side support with locking structure for the belt module of FIG. 2.
Figure 4:
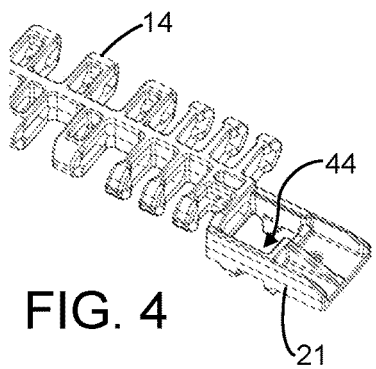
FIG. 4 is an enlarged isometric view of the outer side of the belt module of FIG. 2 with the side support removed.
Figure 5:
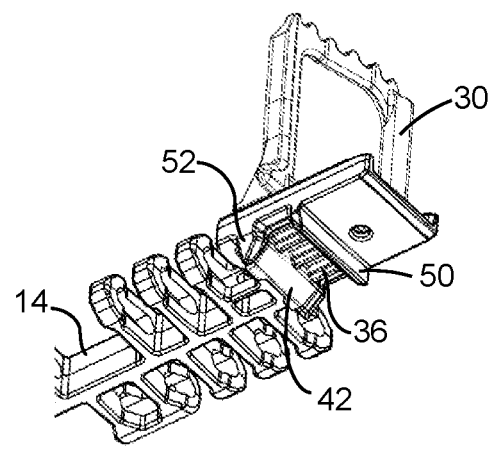
FIG. 5 is an enlarged bottom isometric view of the outer side of the belt module of FIG. 2 with the side support of FIG. 3 installed.

As shown in FIG. 3, the outer side support 30 has locking structure 34 at the top edge and complementary locking structure 36 at the bottom. The outer support 30 has a base 35 from which two legs 38, 39 extend upward to a bridge 40 at the top. The complementary locking structure 36, along with a guide 42, is formed in the bottom of the base 35. As shown in FIGS. 4 and 5, the outer side support 30 snaps in place in an opening 44 in the outer side 21 of the belt module 14. The complementary locking structure 36 of the outer support 30 extends downward from the module to engage the top locking structure of the tier below. The locking structure shown in this example is in the form of rounded teeth, but could be realized with different interlocking geometries, such as sawtooth, triangular, or any other suitable interlocking geometry.

The outer side support 30 shown in FIG. 3 has a large opening 46 bounded by the base 35, the two legs 38, 39, and the bridge 40. But for strength, the outer side support 30 may include a diagonal strut 48 as in FIG. 2, or the outer side support may be a plate devoid of an opening. If the outer side support 30 is integral with the module 14, the lower locking structure 36 and the guide 42 would instead be formed on the bottom side 23 of the module.

Figure 6:
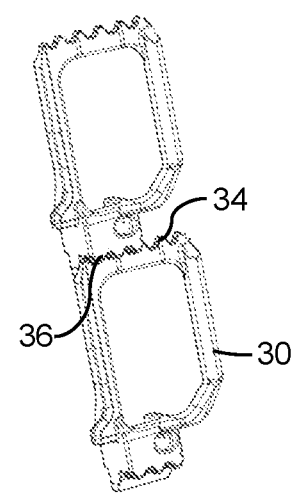
FIG. 6 is an axonometric view of two outer side supports as in FIG. 3 locked together.
Figure 7:
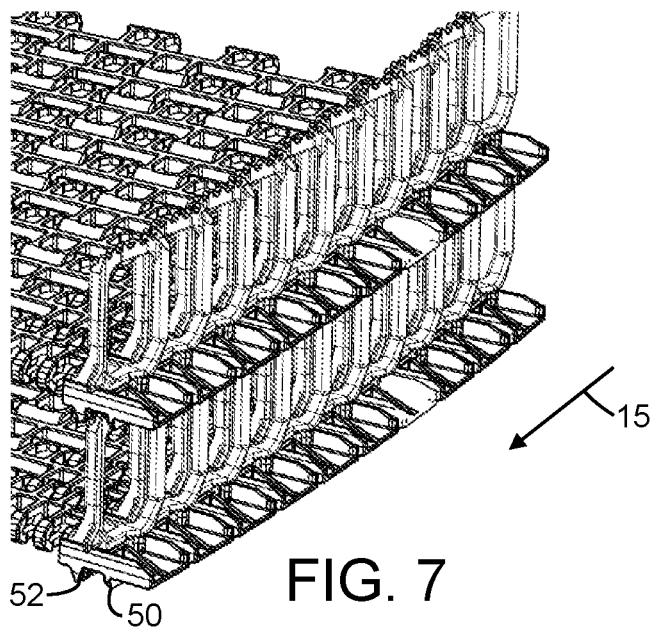
FIG. 7 is an isometric view of a portion of two tiers of a self-stacking belt made of belt modules as in FIG. 2 locked together at the outer side of the belt.

FIG. 6 shows the engagement of the top locking structure 34 of the outer support 30 of a lower tier with the complementary locking structure 36 of a higher tier. When the two tiers are interlocked, they do not slip relative to each other in the direction of belt travel 15, as shown in FIG. 7. Furthermore, the upper locking structure 34 is also restrained against lateral wander by laterally spaced depending guides 50, 52 extending longitudinally at the bottom side of the belt. As shown in FIG. 5, the guide 52 and the guide 42 on the bottom of the outer side support 30 together form a bilateral guide.

Figure 8:
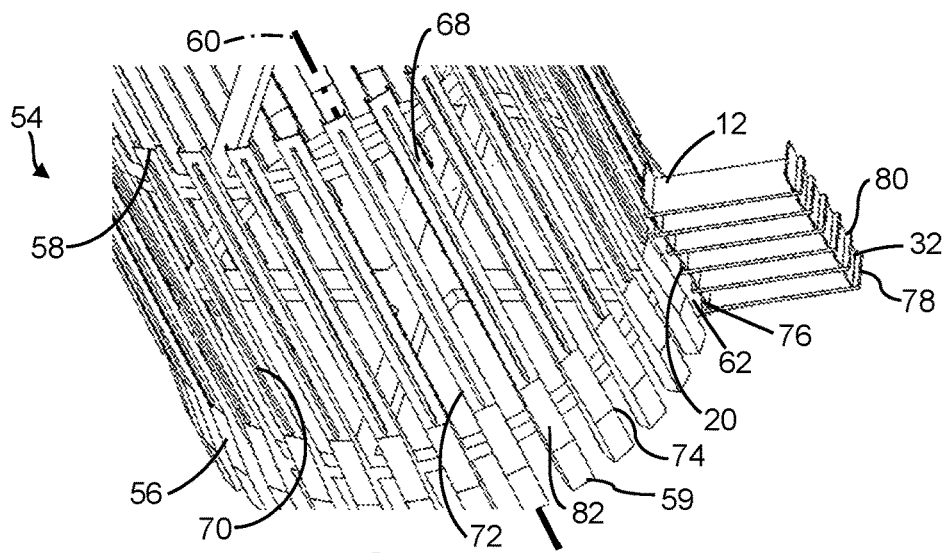
FIG. 8 is an axonometric view of a portion of a spiral drive drum usable in a self-stacking spiral conveyor as in FIG. 1.
Figure 9:
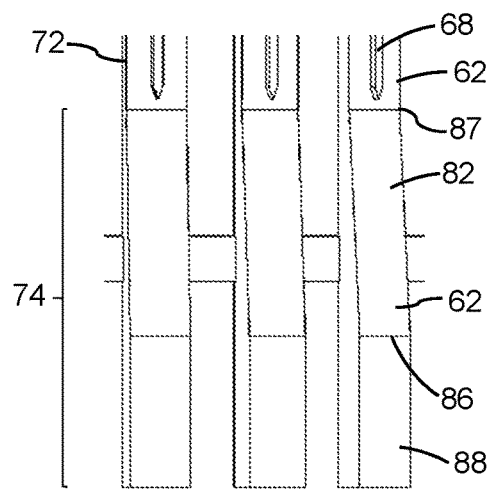
FIG. 9 is an enlarged vertical elevation view of the entry portion of the drive drum of FIG. 8.
Figure 10:
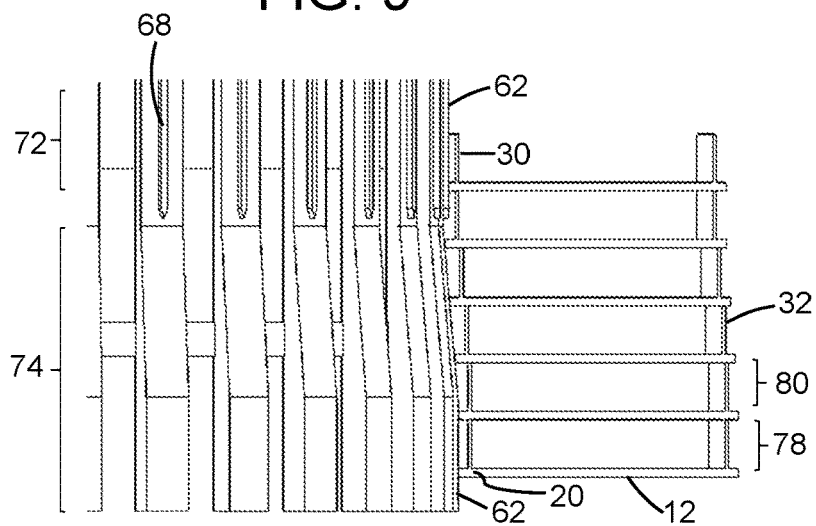
FIG. 10 is a vertical elevation view of the entry portion of the drive drum of FIG. 8 showing the engagement of the lower tiers of the conveyor belt with the drive drum.

A drive drum 54 for a self-stacking spiral conveyor is shown in FIGS. 8-10. The drum 54 has an arrangement of parallel drive members 56 that extend in length generally vertically from tops 58 to bottoms 59 and define a cylinder. The drum 54 is rotated conventionally by a drum drive including a motor and a gear train (not shown). The drum 54 and the drive members 56 on its periphery rotate about a vertical axis 60 (as also shown in FIG. 1). The vertical axis of rotation 60 is also the axis of symmetry of the cylinder, whose diameter varies. The drive members 56 have outer faces 62 that contact the inner side 20 of the belt at the end of driven protrusions, such as drive lugs 64 (FIG. 2), protruding radially inward toward the vertical axis from the inner side to set the distance between the vertical axis and the stacker belt 12.

The drive members 56 are divided into entrance segments 74 and positive-drive segments 72 that have ridges 68 extending radially outward of the outer faces 62. The ridges 68 have drive faces 70 that engage the driven protrusions at the inner side of the stacker belt 12 and drive it on the helical path without slip. In the example of FIGS. 8-10, the ridges 68 are formed on the positive-drive segments 72 of the drive members 56 for which the outer faces 62 are at a constant distance from the vertical axis 60. The belt entrance segments 74 are devoid of ridges and provide flat outer faces 62 that contact the inner side 20 of the stacker belt 12. The belt 12 comes into initial contact with the drive drum 54 at a tangent infeed point 76 in the entrance segment 74. As the belt 12 enters the entrance portion tangentially into its helical path, the lowest tier 78 engages the bottom of the second tier 80. The inner and outer supports 30, 32 of the lowest tier move into supporting contact with the bottom side of the tier above. And the upper locking structure of the outer support 32 of the lowest tier interlocks with the lower locking structure of the tier above. Because of the interlock, the upper tiers help drive the lower tiers in the entrance segment 74 even though the lower tiers are not positively driven by the ridges 68 in the positive-drive segment 72. This allows multiple belt tiers to be in contact with the entrance portion before they gradually advance along the helical path into positive engagement with the ridges 68.

To reduce belt tension, the entrance segment 74 has a transition portion, or segment 82, in which the distance of the outer face 62 from the vertical axis 60 varies from a maximum distance at a lower distal end 86 to a lesser minimum distance at a proximal end 87 to the positive-drive segment 72. The entrance segment 74 may also include a lower entry portion 88 whose outer face 62 is a constant distance, i.e., the maximum distance of the transition portion 82, from the vertical axis 60. The gradual reduction in the cylindrical drum's effective diameter, i.e., the distance from the vertical axis 60 to the inner side 20 of the stacker belt 12 in the entrance segment 74, helps lower the belt tension as it enters the positive-drive segment 72 and first engages the drive ridges 68. Even though the entrance segment 74 contacts multiple tiers, it is still shorter than the positive-drive segment 72, which engages more tiers around the drum.

Figure 11:
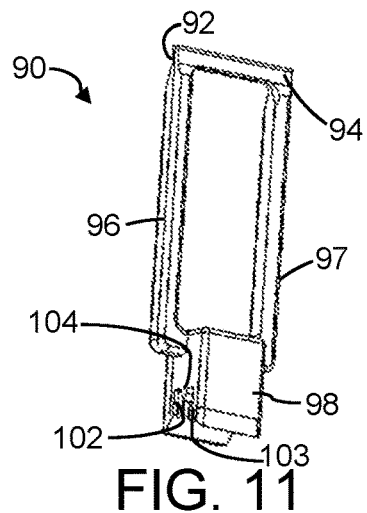
FIG. 11 is an axonometric view of another version of a locking outer side support for a belt module as in FIG. 2.
Figure 12:
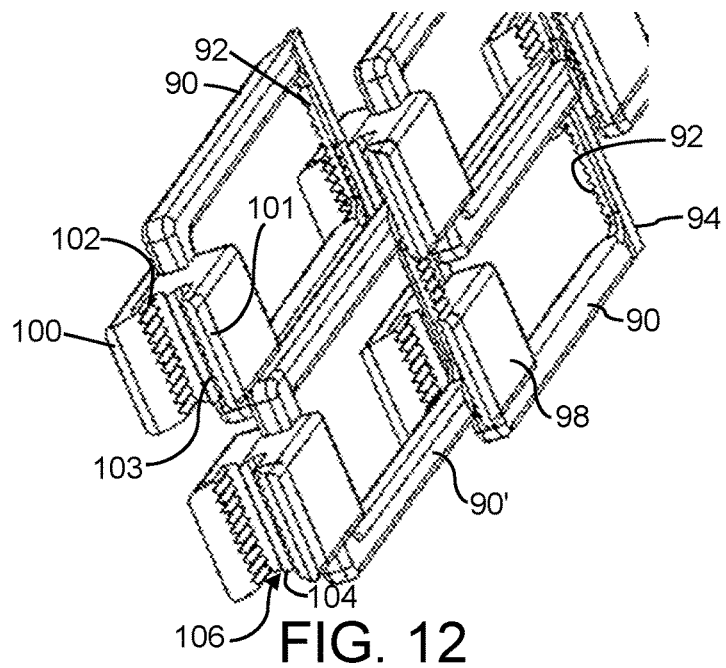
FIG. 12 is an axonometric view of outer side supports as in FIG. 11 shown interlocked from tier to tier.

Another version of a locking outer side support usable in a belt module as in FIG. 2 is shown in FIG. 11. The support 90 differs from the support 30 of FIG. 3 in that its locking structure is not upward-facing. Rather its locking structure 92 as shown in FIG. 12, is laterally facing on an upper bridge 94 at the ends of two legs 96, 97 extending up from a base 98. The locking structure 92 faces inward on the supports 90 on even (or odd) belt rows and outward on the supports 90', on odd (or even) belt rows. Extending down from the base 98 are two depending guides 100, 101. The guides 100, 101 have laterally facing locking structures 102, 103 shown in this example as rows of triangular teeth that match triangular teeth on the upper locking structure 92 on the bridge. Like the outer side support 30 of FIG. 3, the side support can be a replaceable piece or can be integrally formed with the module body. Or the base can be integrally formed with the module body, and the legs and bridge made to fasten to the module body. Also formed in the base 98 is a plow 104 that protrudes downward into a gap 106 between the facing locking structures 102, 103. The plow 104 is shown as an elongated triangular wedge with angled faces that extend the length of the base 98.

Figure 13A:
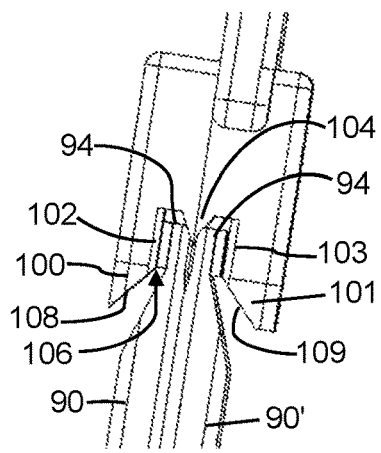
FIGS. 13A and 13B are enlarged views of the outer side supports of FIG. 12 just before and after interlocking engagement.
Figure 13B:
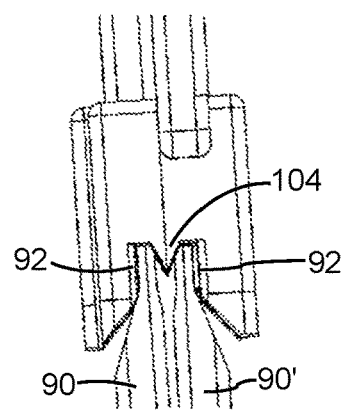

FIG. 13A shows two adjacent outer supports 90, 90' just before locking engagement with the laterally facing locking structure 102, 103 of the belt tier above. Beveled faces 108, 109 on the guides 100, 101 direct the bridges 94 of the side supports 90, 90' into the gap 106. When the bridges 94 reach the vertex of the plow 104, the bridge of the side support 90' with the outward-facing locking structure is pushed by the outer angled face of the plow 104 outward into engagement with the complementary locking structure 103 on the inward-facing face of the tier above as shown in FIG. 13B. And the bridge of the side support 90 with the inward-facing locking structure is pushed by the inner angled face of the plow 104 inward into engagement with the complementary locking structure 102 on the outward-facing face of the tier above. In that way, the plow 104 wedges the two consecutive side supports 90, 90' apart and into interlocking engagement with the tier above. The lateral interlocking engagement of the tiers allows the outer side supports 90, 90' to move with less vertical displacement than with the side supports of FIG. 6.

Although the features of the invention described in detail are for an upgoing spiral stacker belt, the same features can be used in a downgoing spiral. For a downgoing spiral the entrance segment would be inverted and reside on the drive drum above an inverted positive-drive segment from which the stacker belt would exit at its lower end. It would also be possible for the ridges to extend onto the entrance portion for either an upgoing or a downgoing spiral conveyor.

What is claimed is:

1. A spiral conveyor comprising:
   an arrangement of drive members extending in length from tops to bottoms and defining a cylinder having a vertical axis about which the arrangement of drive members is rotatable;
   a conveyor belt arranged to follow a helical path in multiple tiers up or down the drive members;
   wherein the conveyor belt extends in thickness from a top side to a bottom side and in width from an inner side at the drive members to an outer side and includes inner side supports standing up from the top side at the inner side and outer side supports standing up from the top side at the outer side to support the bottom side of the conveyor belt at the inner and outer sides on the tier above on the helical path;
   wherein the outer side supports have first locking structure and the conveyor belt has second locking structure at the outer side at the bottom side that engages the first locking structure on the tier below to lock the tiers together;
   wherein the drive members have an outer face along which the conveyor belt rides on the helical path and whose distance from the vertical axis is greater in a second segment at the bottom of the drive member than in a first segment extending from the second segment to the top for an upgoing conveyor belt on the helical path or is greater in a second segment at the top of the drive member than in a first segment extending from the second segment to the bottom for a downgoing conveyor belt on the helical path;
   wherein the distance from the vertical axis to the outer faces of the first segments is constant at a first distance;
   wherein the drive members include ridges only in the first segment that extend radially outward of the outer faces along a portion of the length of the drive members to positively drive the conveyor belt in the first segment without slip along the helical path.

2. A spiral conveyor as claimed in claim 1 wherein the distance from the outer face of the second segments to the vertical axis varies from the first distance to a greater second distance.

3. A spiral conveyor as claimed in claim 2 wherein the drive members include third segments in which the distance of the outer face from the vertical axis is constant at the second distance.

4. A spiral conveyor as claimed in claim 1 wherein the second locking structure is formed on the outer side support at the bottom side of the conveyor belt.

5. A spiral conveyor as claimed in claim 1 wherein the first locking structure on the outer side supports faces alternately inward and outward along the length of the conveyor belt.

6. A spiral conveyor as claimed in claim 5 wherein the second locking structure comprises two rows of laterally facing teeth across a gap and a wedge protruding into the gap between the two rows of laterally facing teeth to push the first locking structure of the tier below laterally into interlocking engagement with the second locking structure.

7. A spiral conveyor comprising:
a conveyor belt extending in width from a first side to a second side and including first side supports standing up from the first side and second side supports standing up from the second side and including locking structure;
a plurality of drive members each including a first segment and a second segment and extending in length in a generally vertical direction and rotatable about a vertical axis, wherein the first segment is continuous with the second segment;
wherein at least some of the plurality of drive members are arranged to engage the first side of the conveyor belt in the first and second segments in positive engagement only in the first segment and drive the conveyor belt without slip on a helical path in tiers locked together by the locking structure;
wherein the plurality of drive members are arranged to space the conveyor belt from the vertical axis so that the distance of the conveyor belt from the vertical axis varies along the length of the drive members;
wherein the second segment includes a first portion having an outer face whose distance from the vertical axis is constant at a first distance and a second portion having an outer face whose distance from the vertical axis varies from the first distance to a lesser second distance at the first segment.

8. A spiral conveyor as claimed in claim 7 wherein the first and second segments have outer faces spacing the conveyor belt from the vertical axis and wherein the first segments have ridges extending radially away from the vertical axis to engage the conveyor belt and wherein the second segments are devoid of ridges that engage the conveyor belt.

9. A spiral conveyor comprising:
a spiral stacker belt having a plurality of first and second supports at first and second sides of the stacker belt, the belt being capable of traveling up or down a helical path of multiple tiers of the stacker belt spaced apart and supported by the first and second supports on the tier below;
a plurality of drive members extending in length in a generally vertical direction and being rotatable about a vertical axis, at least some of which each include:
a positive-drive segment having a drive ridge; and
an entrance segment devoid of drive ridges, wherein the entrance segment extends upward to the positive-drive segment from below the positive-drive segment for an upgoing spiral stacker belt and extends downward to the positive-drive segment from above the positive-drive segment for a downgoing spiral stacker belt;
wherein the entrance segment maintains the first side of the conveyor belt farther from the vertical axis than does the positive-drive segment;
wherein the spiral stacker belt enters a helical path about the plurality of drive members along the entrance segment and is positively driven without slip up or down the helical path by the drive ridges in the positive-drive segment;
wherein the entrance segment is long enough that multiple tiers of the spiral stacker belt can wrap around the entrance segment before engaging the drive ridges on the positive-drive segment.

10. A spiral conveyor as claimed in claim 9 wherein the length of the positive-drive segment is greater than the length of the entrance segment.

11. A spiral conveyor as claimed in claim 9 wherein the positive-drive segments have outer faces whose distance from the vertical axis is constant along the drive members.

12. A spiral conveyor as claimed in claim 9 wherein the entrance segments include first and second portions and outer faces whose distance from the vertical axis is constant at a first distance in the first portion of the entrance segments and whose distance from the vertical axis varies from the first distance to a lesser second distance in the second portion.

13. A spiral conveyor as claimed in claim 12 wherein the second portion of the entrance segment is adjacent the positive-drive segment.

14. A spiral conveyor belt as claimed in claim 9 wherein the spiral stacker belt includes driven protrusions at the first side that are engaged by the drive ridges in the positive-drive segment of the drive members.

15. A spiral conveyor as claimed in claim 9 wherein the second supports at the second side include locking structure that locks a tier of the spiral stacker belt to the tier above on the helical path.

16. A conveyor belt module comprising:
a central portion extending longitudinally from a first end to a second end, laterally from a first side to a second side, and in thickness from a top side to a bottom side;
a side support standing up from the top side at the second side, wherein a distal end of the side support has locking structure having first teeth laterally facing either inward or outward;
laterally facing second teeth forming locking structure at the bottom side of the second side for engaging the first teeth of the locking structure of the side support of another such conveyor belt module below.

17. A conveyor belt module as claimed in claim 16 wherein the side support comprises two legs extending upward from the second side of the conveyor belt module to a bridge bridging the distal ends of the legs, wherein the locking structure is formed on a lateral side of the bridge.

18. A conveyor belt module as claimed in claim 17 wherein the side support comprises a base removably attachable to the second side and from which the two legs extend upward.

19. A conveyor belt module as claimed in claim 18 wherein the laterally facing locking structure at the bottom side is formed on the base of the side support.

\* \* \* \* \*